United States Patent
Herz

(10) Patent No.: US 10,702,029 B2
(45) Date of Patent: Jul. 7, 2020

(54) WATCH BAND OR OTHER WEARABLE STRAP WITH TEAR AWAY SAFETY FEATURE

(71) Applicant: NATOWATCHBANDS.COM, LLC, Austin, TX (US)

(72) Inventor: Scott Austin Herz, Austin, TX (US)

(73) Assignee: Natowatchbands.com, LLC, Austin, TX (US)

( * ) Notice: Subject to any disclaimer, the term of this patent is extended or adjusted under 35 U.S.C. 154(b) by 0 days.

(21) Appl. No.: 16/444,505

(22) Filed: Jun. 18, 2019

(65) Prior Publication Data

US 2019/0298009 A1    Oct. 3, 2019

Related U.S. Application Data

(63) Continuation-in-part of application No. 16/278,237, filed on Feb. 18, 2019.

(60) Provisional application No. 62/632,245, filed on Feb. 19, 2018.

(51) Int. Cl.
*A44C 5/00* (2006.01)
*A45F 5/00* (2006.01)
*B32B 3/26* (2006.01)

(52) U.S. Cl.
CPC ...... *A44C 5/0053* (2013.01); *A45F 2005/008* (2013.01); *B32B 3/266* (2013.01); *B32B 2307/582* (2013.01)

(58) Field of Classification Search
CPC ....... A44C 5/00; A44C 5/0053; A44C 5/0061; A44C 5/0069; A44C 5/0076; A44C 5/0084; A44C 5/0092; A44C 5/007; A44C 5/0015; A44C 5/0023; A44C 5/003; A44C 5/0038; A44C 5/0046; A45F 2005/005; A45F 2005/006; B32B 2307/582; B32B 3/266
USPC ......................... 224/164–179; 368/281–283; 24/265 WS; 428/43; 40/674
See application file for complete search history.

(56) References Cited

U.S. PATENT DOCUMENTS

| 4,882,813 | A  | * | 11/1989 | Nakamura | ............. | B65D 63/16 24/16 PB |
| 5,082,156 | A  | * | 1/1992 | Braun | ....................... | A45F 5/00 224/220 |
| 5,657,645 | A  | * | 8/1997 | Abraham | ............. | A44C 5/0053 63/3 |
| 6,370,913 | B1 | * | 4/2002 | Voeltzel | ............... | A44C 9/0038 63/15 |
| 7,115,314 | B2 | * | 10/2006 | Mitchell, Jr. | ............. | B32B 7/06 428/43 |

(Continued)

*Primary Examiner* — Justin M Larson
(74) *Attorney, Agent, or Firm* — Brian F. Russell; Russell Ng PLLC

(57) ABSTRACT

In some embodiments, a watch band or other wearable strap includes at least one tear away region at which the cross-sectional area of the base material is reduced, such that the force required to break away or tear away the wearable band from the body of the wearer is predetermined. In other embodiments, the material utilized to form the tear away region(s) of the wearable strap may alternatively or additionally have a lower ultimate tensile strength than the material utilized to form other portions of the wearable strap, again permitting the force required to break away or tear away the wearable band from the body of the wearer to be predetermined.

15 Claims, 3 Drawing Sheets

(56) References Cited

U.S. PATENT DOCUMENTS

| | | | | |
|---|---|---|---|---|
| 7,758,712 B2* | 7/2010 | Maki | B32B 5/08 | 156/161 |
| 7,805,871 B2* | 10/2010 | Ciarrocchi | G09F 3/005 | 283/75 |
| 8,042,293 B1* | 10/2011 | Bennett | G09F 3/0288 | 24/17 B |
| 8,595,967 B1* | 12/2013 | Cook | A44C 5/0069 | 24/265 A |
| 8,741,410 B2* | 6/2014 | Cattacin | A47K 10/16 | 428/43 |
| 8,844,158 B2* | 9/2014 | Dehn | A61F 13/53704 | 34/381 |
| 9,010,591 B2* | 4/2015 | Paulitsch | A45F 5/00 | 224/148.6 |
| 9,126,453 B2* | 9/2015 | Takashima | A44C 5/0015 | |
| 9,299,271 B2* | 3/2016 | Scheid | B32B 38/0004 | |
| 10,285,523 B2* | 5/2019 | Pugsley | A47G 21/18 | |
| D860,034 S | 9/2019 | Herz | D11/3 | |
| 10,398,200 B2* | 9/2019 | Baranski | A44C 5/0069 | |
| D861,529 S * | 10/2019 | Herz | D11/3 | |
| D862,276 S * | 10/2019 | Herz | D11/3 | |
| 10,427,365 B2* | 10/2019 | Hager | B32B 27/302 | |
| 2006/0081665 A1* | 4/2006 | Nguyen | A45F 5/00 | 224/267 |
| 2007/0098944 A1* | 5/2007 | Mitchell, Jr. | B32B 7/06 | 428/43 |
| 2007/0130813 A1* | 6/2007 | Stacy | A44C 5/003 | 40/633 |
| 2009/0274015 A1* | 11/2009 | Sun | A44C 5/0053 | 368/282 |
| 2010/0133307 A1* | 6/2010 | Martin | A45F 5/00 | 224/257 |
| 2011/0070391 A1* | 3/2011 | Cotton | A61F 13/0269 | 428/43 |
| 2012/0125958 A1* | 5/2012 | Waltersdorf | A45F 3/14 | 224/257 |
| 2013/0167288 A1* | 7/2013 | Rowland | A41F 9/002 | 2/338 |
| 2014/0013638 A1* | 1/2014 | Braun | G09F 3/00 | 40/633 |
| 2015/0253736 A1* | 9/2015 | Watterson | A61B 5/486 | 368/10 |
| 2017/0071297 A9* | 3/2017 | Walchle | F16B 45/00 | |
| 2019/0223580 A1* | 7/2019 | Wasylko | F41C 33/048 | |
| 2019/0254390 A1* | 8/2019 | Herz | A44C 5/0053 | |
| 2019/0298009 A1* | 10/2019 | Herz | A44C 5/0053 | |

* cited by examiner

WATCH BAND OR OTHER WEARABLE STRAP WITH TEAR AWAY SAFETY FEATURE

BACKGROUND OF THE INVENTION

The present invention relates in general to safety straps and, in particular, to watch bands or other wearable straps with a tear away safety feature.

Watches and other wearable technology are worn, for example, around a wearer's wrist, using a strap or band. Such bands typically wrap around the circumference of a person's wrist or other body part and fasten via a buckle or clasp. Such straps can also be made from many materials including, without limitation, silicone or other rubbers, leather, nylon, canvas, etc.

Wearable technology and wrist watches continue to have increased application in industrial environments, sports environments, and healthcare environments. In such settings, wearer safety is a major concern. For example, businesses and workers in an industrial setting want to be assured that if any feature of their watch or watch band (as well as other wearable bands or straps, such as belts, suspenders and other straps) is stuck in a machine or conveyor, the watch should break loose from the wrist or other body part, reducing the likelihood that the wearer would be subject to physical harm or injury.

BRIEF SUMMARY

The present disclosure appreciates that it would be desirable to provide a watch band or other wearable strap that will tear away from the wearer under specific conditions.

A watch band or other wearable strap that may be made from a great variety of base materials including, but not limited to, silicone rubber. The wearable strap will have an ultimate tensile strength that is specific to the intrinsic properties of the base material and the dimensions of the material. The ultimate tensile strength specifies the force required to break the wearable strap and is typically expressed as an amount of force per unit area (e.g., pounds per square inch (psi) or Pascals (Pa)). As one example, the ultimate tensile strength of silicone similar to that used in watch bands made by Barton® Watch Bands is approximately 1233 psi or 8.5 MPa.

If the tensile strength of the base material used in a wearable strap is known, then the force at which the wearable strap will "break away" or "tear away" can be controlled by selecting the cross-sectional area and/or material properties of the wearable strap at one or more regions. Accordingly, in at least some embodiments, a watch band or other wearable strap includes at least one tear away region at which the cross-sectional area of the base material is reduced, such that the force required to break away or tear away the wearable band from the body of the wearer is predetermined. In other embodiments, the material utilized to form the tear away region(s) of the wearable strap may alternatively or additionally have a lower ultimate tensile strength than the material utilized to form other portions of the wearable strap, again permitting the force required to break away or tear away the wearable band from the body of the wearer to be predetermined. The tear away region(s) may take on many embodiments and may come in many shapes and locations, some of which are disclosed herein without limitation.

DETAILED DESCRIPTION

Figure 1:
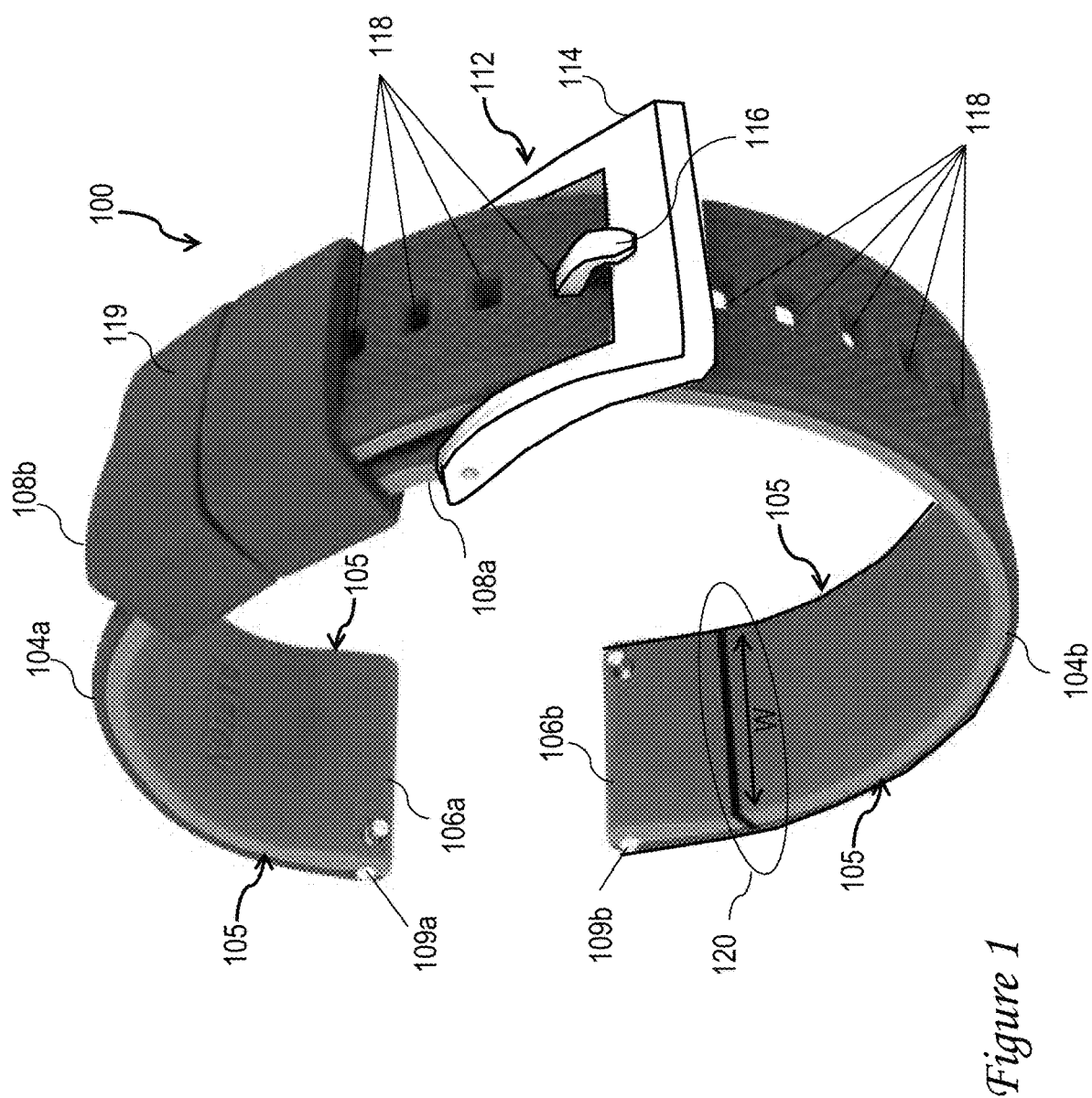
FIG. 1 illustrates a wearable strap including at least one tear away region.

With reference now to the figures and in particular with reference to FIG. 1, there is illustrated a wearable strap, which in this example is a watch band 100. Wearable straps like watch band 100 are configured to be worn around an appendage, waist, neck, head, or other body part of a human or an animal body and are typically (but not necessarily) fastened with a buckle, clasp, tie, or other closure mechanism. In general, the wearable strap is elongate and thus has a length (or circumference) that greatly exceeds its width and thickness. The wearable strap may be made from any number of base materials including, without limitation, silicone rubber, leather, nylon, canvas, metal, etc. In some cases, the base material may also be combined with one or more finish materials, for example, to achieve a desired aesthetic appearance. As noted above, each base material has an intrinsic ultimate tensile strength.

In the illustrated embodiment, watch band 100 is a two-part wearable strap, including a first part 104a and a second part 104b. Each of first part 104a and second part 104b has a respective length extending between a first end 106a or 106b and second end 108a or 108b. In addition, each of first part 104a and second part 104b has a width W, which is orthogonal to the length (and can vary along the length) and extends between edges 105. Each of first part 104a and second part 104b also has a thickness T (seen best in FIGS. 2-4, which are described below). Thickness T may also vary along the length of watch band 100. It is typical for a watch band such as watch band 100 to have an overall length of between 165 mm and 330 mm, a width of between 5 mm and 40 mm, more commonly, between 16 mm and 30 mm, and a thickness of between 0.5 mm and 5 mm and, more commonly, between 1 mm and 4 mm.

Referring specifically to first part 104a of watch band 100, first end 106a includes or is coupled to a watch case attachment, which in this embodiment is an integral spring bar 109a that engages a first pair of lugs of a watch case (not illustrated). Second end 108a of first part 104a is coupled to a conventional watch band buckle 112. Buckle 112 includes a loop 114 and a tang 116 that is rotatable about a hidden bar of loop 114.

Second part 104b of watch band 100 also includes a watch case attachment at its first end 106b, which in this embodiment is again an integral spring bar 109b that engages a second pair of lugs of the watch case. Between first end 106b and second end 108b of second part 104b, a series of holes 118 are formed through second part 104b to permit first part 104a to be coupled to second part 104b by the insertion of second end 110b through loop 114 and the insertion of tang 116 through a selected one of holes 118. By varying which one of the holes 118 tang 116 is inserted through, the overall wearable length of inner circumference watch band 100 can be adjustably sized in accordance with the wearer's wrist size and/or preference (typically, between 125 mm and 250 mm). The portion of second part 104b toward second end 110b that extends past buckle 114 can be retained in close relation to first part 104a by one or more band retainers 119 freely riding on first part 104a.

In one or more embodiments, a wearable strap such as watch band 100 includes one or more break away or tear away regions of lower ultimate tensile strength than other portions of the wearable strap. For example, in the illustrated example, watch band 100 includes at least one tear away region 120 that has a lower ultimate tensile strength than other portions of watch band 100. The ultimate tensile strength of tear away region 120 is controlled so that watch band 100 will reliably break away or tear away from the body when subjected to at least a minimum breaking force in excess of the ultimate tensile strength of tear away region 120, even though that minimum breaking force is less than the ultimate tensile strength of other regions or components of watch band 100. The minimum breaking force can be predetermined by controlling the properties of the tear away region 120 of wearable strap 100.

For example, in some embodiments, the ultimate tensile strength of the tear away region 120 and the minimum breaking force at which the watch band 100 will break are controlled by the cross-sectional area of the watch band 100 in tear away region 120. For example, the cross-sectional area of watch band 100 in tear away region 120 can be reduced as compared to other areas of watch band 100. This reduced cross-sectional area can be realized in many different embodiments and in many shapes and locations, only some of which are disclosed herein without limitation.

Figure 2:
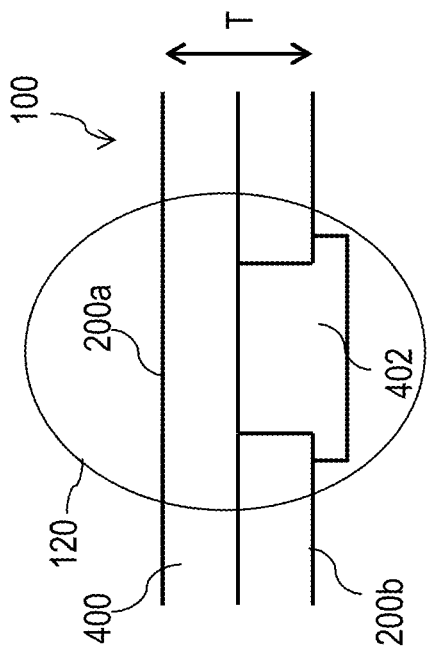
FIG. 2 depicts a detailed elevation view of a wearable strap having a tear away region in which the lower ultimate tensile strength of the tear away region is achieved by forming the tear away region with decreased thickness on an inner side of the wearable strap.

As shown in greater detail in the elevation view of watch band 100 given in FIG. 2, in one embodiment, the ultimate tensile strength of tear away region 120 is reduced as compared to other regions of watch band 100 by reducing the thickness T of watch band 100 at one location. This reduction in thickness T reduces the cross-sectional area at tear away region 120 and consequently reduces the minimum breaking force required to tear away watch band 100 away from the body. It should be noted that the reduction in thickness T is independent of the width W, meaning that tear away region 120 can have a width W consistent with that of the surrounding and/or adjoining portions of watch band 100. In FIG. 2, the reduction in thickness T is made by forming a recess or trench 202 on an inner side 200a of watch band 100 rather than on an outer side 200b, thus preserving the consistency of the aesthetic appearance of tear away region 120 with the remainder of watch band 100 when watch band 100 is in use. Alternatively, as shown in the elevation view given in FIG. 3, the reduction in thickness T can be made by forming a recess or trench 302 on outer side 200b of watch band 100 in addition to (or rather than) on inner side 200a. This alternative design enables tear away region 120 to be readily visually verified when watch band 100 is in use.

Figure 3:
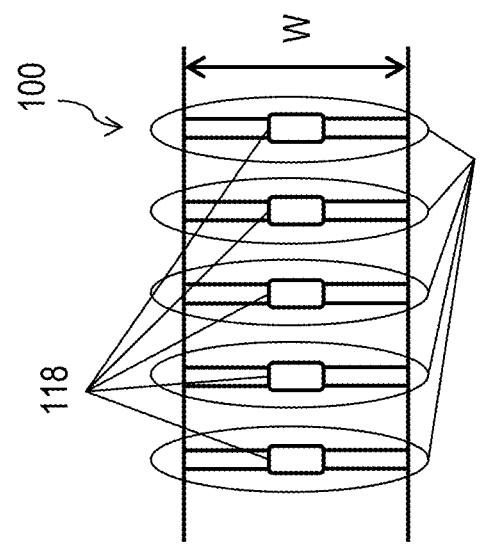
FIG. 3 illustrates another detailed elevation view of a wearable strap having a tear away region in which the lower ultimate tensile strength of the tear away region is achieved by forming the tear away region with decreased thickness on an outer side of the wearable strap.

Although FIGS. 2-3 show specific embodiments in which watch band 110 has approximately half of the thickness Tin tear away region 120 as compared to the adjoining portions of watch band 100, it should be understood that the relative reduction in thickness will depend on the geometry of watch band 100, the material properties of the base material of watch band 100, and the desired minimum breaking force. For example, assuming a silicone watch band having band having an ultimate tensile strength of 8.5 MPa, the cross-sectional area of the watch band in tear way region 120 would be approximately 3.5 mm$^2$ for an approximately 29.73 N minimum breaking force (i.e., the terrestrial force of a 3 kg mass) and approximately 25.0 mm$^2$ for an approximately 196 N breaking force (i.e., the terrestrial force of a 20 kg mass). If this silicone watch band has a uniform width of 18 mm including within tear away region 120, the thickness of the watch band in tear array region 120 would then be about 0.2 mm for a 29.73 N minimum breaking force and about 1.25 mm thick for a 196 N minimum breaking force.

The desired cross-sectional area of the tear away region 120 can also be obtained in many ways. For example, as an alternative to (or in addition to) employing a reduced thickness T (as shown in FIG. 2), watch band 100 can have a narrower width W at tear away region 120 than at the surrounding portions of watch band 100. Thus, for example, to obtain a desired cross-sectional area, material could be removed or eliminated from one or both edges of watch strap 100, and/or inner side 200a, and/or outer side 200b.

Figure 6:
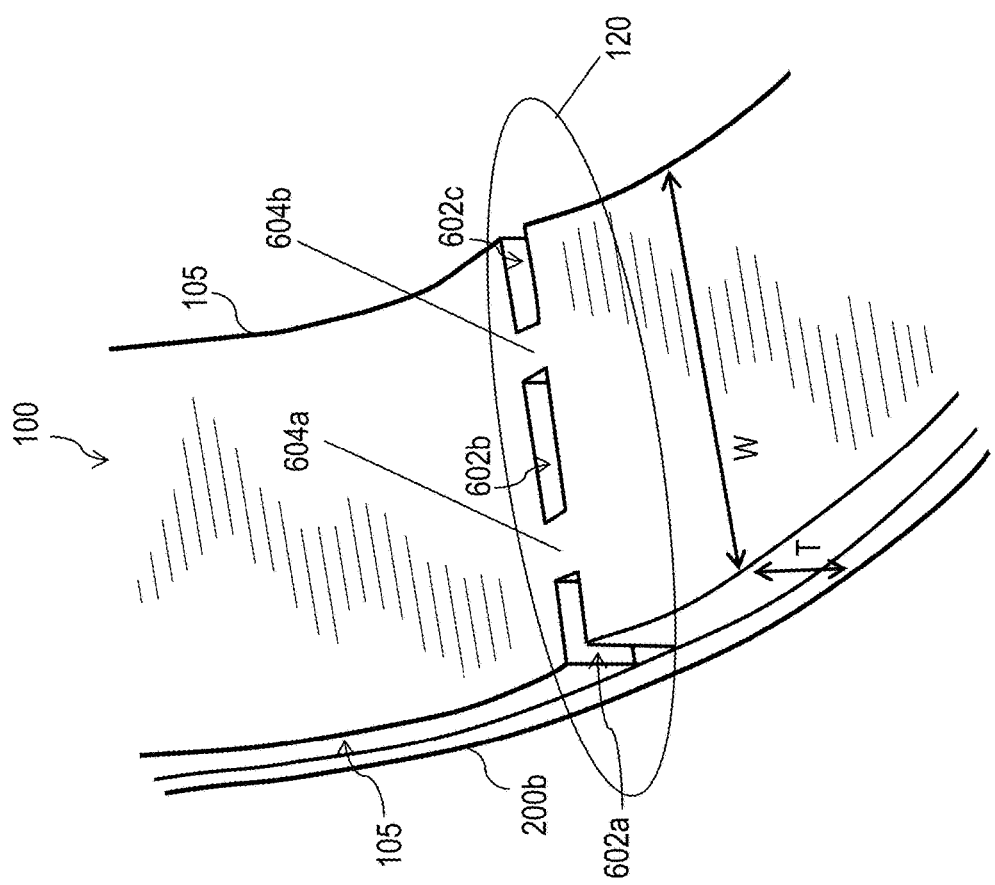
FIG. 6 depicts a perspective view of another embodiment of a wearable strap including a tear away region having a decreased cross-sectional area.

To provide another specific example of an alternative design, FIG. 6 illustrates a perspective view of an embodiment of a watch strap 100 in which a tear away region 120 of reduced cross-sectional area is obtained by removing material from inner side 200a within tear away region 120, while retaining an overall width W of watch band 100 at tear away region 120 consistent with the adjoining portions of watch strap 100. Unlike the embodiments of FIGS. 2-3 in which a continuous trench or recess 202 or 302 is formed across the entirety of the width W of watch strap 100, in the embodiment of FIG. 6 tear away region 120 includes multiple discontinuous recesses (in this case, recesses 602a, 602b, 602c) separated by one or more lands (in this case, lands 600a, 600b). One or more of recesses 602 can, but is/are not required to, extend to one or more of edges 105. With this construction, tear away region 120 can, if desired, have a greater thickness at lands 604a, 604b than at other portions of tear away region 120, for example, a thickness T consistent with the portions of watch strap 100 adjoining tear away region 120. As will be appreciated by those skilled in the art, the consistency of thickness of watch strap 100 across a portion or portions of tear away region 120 can provide increased comfort (and/or reduced irritation) as watch band 100 contacts the wrist of the wearer. It will further be appreciated that in yet other embodiments, a tear away region 120 structured similarly to that shown in FIG. 6 can alternatively or additionally be formed in outer side 200b of watch band 100.

Figure 7:
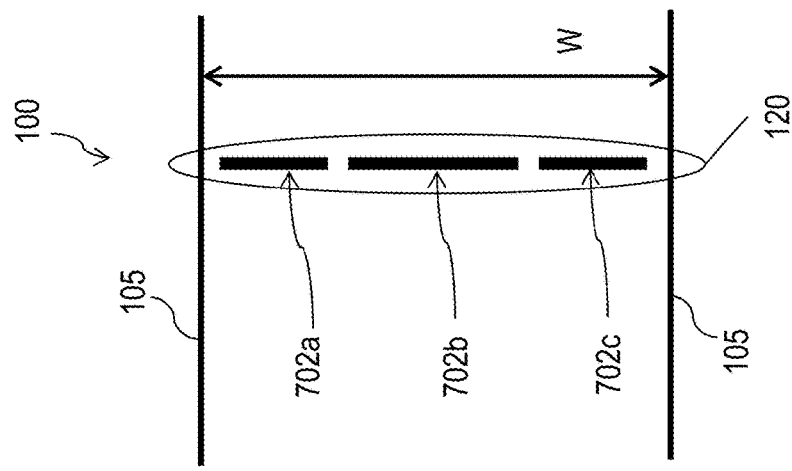
FIG. 7 illustrates another detailed plan view of a wearable strap having a tear away region formed by one or more perforations formed through the wearable strap.

FIG. 7 illustrates a plan view of yet another embodiment of a watch strap 100 including a tear away region 120 having a decreased cross-sectional area. In this embodiment, a decreased cross-sectional area is obtained within tear away region 120 by forming one or more recesses (in this case, perforations 702a, 702b, 702c) completely through watch strap 100. As will be appreciated, any number of perforations 702 can be implemented to control the cross-sectional area of tear away region 120. The corresponding dimensions of the different perforations 702 can be, but are not required to be identical, as shown in FIG. 7 by perforations 702a and 702c having identical dimensions and perforation 702b having a greater dimension across the width of watch strap 100. In at least some embodiments, none of perforations 702 extends to either edge 105 of watch strap 100. Perforations 702 can have, but are not required to have, at least one pair of planar, parallel opposing sidewalls. As specifically illustrated in FIG. 7, the minimum dimensions of perforations 702 along the long dimension of watch strap 100 can be quite small, for example, between 2.25 mm and 0.5 mm and, more particularly, between 1.75 mm and 0.5 mm. In such embodiments, tear away region 120 will be visually unobtrusive.

Figure 4:
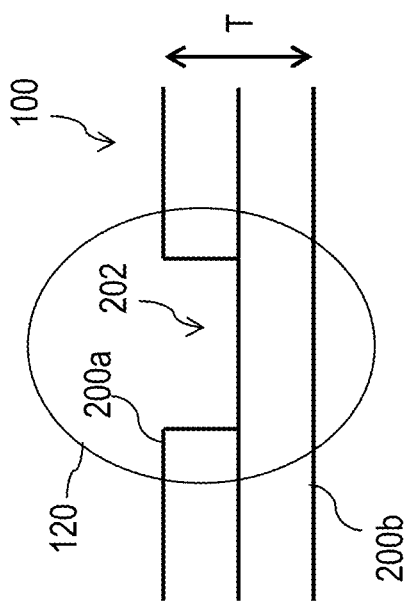
FIG. 4 depicts another detailed elevation view of a wearable strap having a tear away region in which the lower ultimate tensile strength of the tear away region is achieved by forming the tear away region with a different material having a lower ultimate tensile strength.

In some embodiments, the ultimate tensile strength of the tear away region 120 and the minimum breaking force at which the watch band 100 will break are controlled by the use of a different material in tear away region 120 than other portions of watch band 100. For example, FIG. 4 is an elevation view of a watch band 100 formed of a first material 400 that includes a tear away region 120 including a second material 402 having a lower ultimate tensile strength than the first material 400. For example, if first material 400 is a metal such as stainless steel, second material 402 can be a silicone having a lower ultimate tensile strength than the metal. As another example, first material 400 may be a silicone having a higher ultimate tensile strength, and second material 400 may be a silicone characterized by a lower ultimate tensile strength. In the embodiment shown in FIG. 4, second material 400 is utilized only across a portion of the overall cross-sectional area of watch band 100 in tear away region 120; in other embodiments, second material 400 may form the entire cross-section of watch band 100 in tear away region 120. Further, in some embodiments, second material 400 may have a distinctive visual appearance (e.g., a different color and/or texture) so that watch band 100 can be readily visually verified as a tear away strap. It should be noted that if a different second material 402 having a lower ultimate tensile strength is utilized to form tear away region 120, tear away region can have the same cross-sectional area as adjoining portions of watch band 100, a consistent cross-sectional area with adjoining portions of watch band 100 (i.e., the same cross-sectional area as the adjoining portions or a cross-sectional area that varies from the adjoining portions in accordance with the overall contour of watch band 100), or even a larger cross-sectional area than the adjoining portions of watch band 100.

Figure 5:
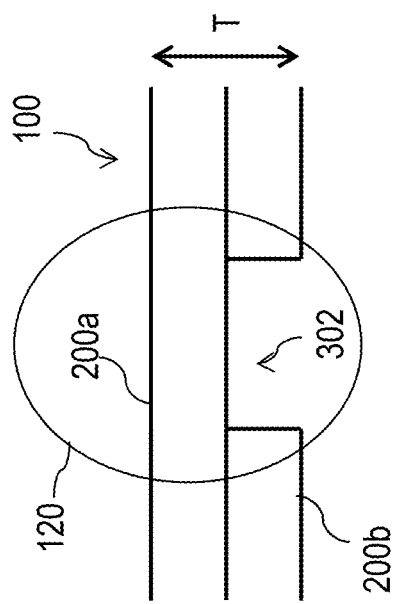
FIG. 5 illustrates a detailed plan view of a wearable strap having tear away regions formed at a plurality of adjustment holes.

It should be understood that any number of tear away regions can be implemented along the length of a wearable strap, such as watch band 100. Further, a tear away region can be implemented at any location along the length of a wearable strap as long as the tear away region would be subjected to force if the wearable strap gets trapped, snagged, or caught in or on an object. For example, with respect to watch band 100, a tear away region 120 can be proximate to (e.g., within 15 mm of) the watch case attachment (e.g., spring bars 108a or 108b) on first end 108a or 108b. As another example, a tear away region 120 can be implemented across the width W of watch band 100 at the location of each of holes 118, as shown in FIG. 5. By ensuring that a potentially breaking force is applied to at least one tear away region, if any part of the wearable strap becomes trapped, snagged, or caught, the potentially breaking force is applied to the tear away region 120 through the wearable strap and will cause the wearable strap to break at the tear away region 120 if the potentially breaking force is equal to or greater than the minimum breaking force.

The minimum breaking force can vary based on, among other things, the environment of intended use, the intended use of the wearable strap, and/or the body member about which the wearable strap is intended to be worn. For example, in some embodiments, the minimum breaking force is between about 30 N (i.e., the terrestrial force applied by an approximately 3 kg mass) and about 245 N (i.e., the terrestrial force applied by an approximately 25 kg mass), and more particularly, between about 45 N (i.e., the terrestrial force applied by an approximately 4.5 kg mass) and about 135 N (i.e., the terrestrial force applied by an approximately 15 kg mass). The ultimate tensile strength and minimum breaking force of the tear away region 120 can be determined in accordance with the ASTM D412 standard. In at least some embodiments, the ultimate tensile strength of the tear away region and thus the minimum breaking force are specifically designed to be less than that of the watch case attachments and buckle 114. In many cases, the minimum breaking force of the tear away region 120 is significantly less than adjoining portions of the watch band, which for a silicone band may be approximately 670 N (i.e., the terrestrial force applied by an approximately 68 kg mass).

Although various embodiments of a watch band including a tear away region have been described, it should be understood that the principles described herein can also be applied to any wearable strap, including, without limitation, rings, bracelets, necklaces, belts, lanyards, suspenders, garment fasteners, pet collars, headlamp bands, and wearable straps for wearable technology (e.g., mobile phones, heart rate monitors, fitness trackers, etc.). Those skilled in the art will appreciate that multiple of the described embodiments of tear away regions and/or features of different embodiments of the described tear away region may be practiced in combination. Further, although a wearable strap having a tear away region as described provides assured safety in industrial environments, it should be understood that the wearable strap can provide enhanced safety in other environments, including sports environments and healthcare environments. In addition, although in some embodiments the tear away region is generally orthogonal to the long dimension of the wearable strap, it should be appreciated that in some embodiments the greater dimension of the tear away region can be formed along the long dimension of the wearable strap or at a non-perpendicular angle to the long dimension of the wearable strap. As utilized herein with reference to units of measure, the terms "about" and "approximately" refer to values within 10% of the stated values.

While the foregoing written description of the invention enables one of ordinary skill to make and use what is considered presently to be the best modes thereof, those of ordinary skill will understand and appreciate the existence of variations, combinations, and equivalents of the specific embodiments, methods, and examples herein. The invention should therefore not be limited by the above described embodiment, method, and examples, but by all embodiments and methods within the scope and spirit of the invention as claimed.

What is claimed is:

1. A product of manufacture, comprising:
 a wearable strap configured to be worn about a member of a living body, wherein the wearable strap has:

a length about the member along a longest dimension of the wearable strap;
two edges;
a width orthogonal to the length and extending between the two edges;
a thickness between an inner surface to be worn toward to the body and an outer surface to be worn away from the living body; and
a tear away region formed across the width of the wearable strap, wherein in the tear away region the wearable strap has:
a width consistent with adjoining portions of the wearable strap; and
multiple recesses formed in the inner surface and extending only partially through the thickness of the wearable strap, wherein at least one of the multiple recesses extends to one of the two edges of the wearable strap, wherein the multiple recesses are linearly aligned between the two edges and each separated from another of the multiple recesses by a land at which the wearable strap has a thickness consistent with adjoining portions of the wearable strap, such that the tear away region has a lesser cross-sectional area and a lower ultimate tensile strength than the adjoining portions of the wearable strap.

2. The product of claim 1, wherein the wearable strap is formed of silicone.

3. The product of claim 1, wherein the wearable strap is formed of a material from a set consisting of nylon, canvas, and metal.

4. The product of claim 1, wherein the tear away region has a visually distinctive appearance from the adjoining portions of the wearable strap.

5. The product of claim 1, wherein the tear away region is one of multiple tear away regions formed in the wearable strap.

6. The product of claim 5, wherein:
the wearable strap has multiple adjustment holes; and
the multiple tear away regions are each formed at a respective one of the adjustment holes.

7. The product of claim 1, wherein:
the wearable strap is a watch band; and
the watch band includes watch case attachments coupled to the watch band.

8. The product of claim 7, and further comprising a watch case coupled to the watch band.

9. The product of claim 1, wherein the one or more recesses have a minimum dimension along the long dimension of watch strap between 2.25 mm and 0.5 mm.

10. The product of claim 1, wherein:
the tear away region has an associated breaking force between about 45 N and about 135 N.

11. A watch band, comprising:
a wearable strap configured to be worn about a member of a living body, wherein the wearable strap includes watch case attachments and has:
a length about the member along a longest dimension of the wearable strap;
two edges;
a width orthogonal to the length and extending between the two edges;
a thickness between an inner surface to be worn toward to the body and an outer surface to be worn away from the living body; and
a tear away region formed across the width of the wearable strap, wherein in the tear away region the wearable strap has:
a width consistent with adjoining portions of the wearable strap; and
multiple recesses formed in the inner surface and extending only partially through the thickness of the wearable strap, wherein at least one of the multiple recesses extends to one of the two edges of the wearable strap, wherein the multiple recesses are linearly aligned between the two edges and each separated from another of the multiple recesses by a land at which the wearable strap has a thickness consistent with adjoining portions of the wearable strap, such that the tear away region has a lesser cross-sectional area-and a lower ultimate tensile strength than the adjoining portions of the wearable strap.

12. The watch band of claim 11, and further comprising a watch band buckle.

13. The watch band of claim 11, wherein:
the watch band includes a first part and a second part, the first part having a buckle;
the second part of the wearable strap has multiple adjustment holes; and
the second part of the wearable strap has multiple tear away regions, each formed across the width of the watch band at a respective one of the adjustment holes, wherein the multiple tear away regions include the tear away region.

14. An apparatus, comprising:
the watch band of claim 11; and
a watch case coupled to watch band by the watch case attachments.

15. A product of manufacture, comprising:
a wearable strap configured to be worn about a member of a living body, wherein the wearable strap has:
a length about the member along a longest dimension of the wearable strap;
two edges;
a width orthogonal to the length and extending between the two edges;
a thickness between an inner surface to be worn toward to the body and an outer surface to be worn away from the living body; and
first and second parts that are selectively separable and coupleable by a buckle of the first part;
the second part has multiple adjustment holes; and
multiple tear away regions each formed across the width of the wearable strap at a respective one of the adjustment holes, wherein at each of the tear away regions the wearable strap has:
a width consistent with adjoining portions of the wearable strap; and
a lesser cross-sectional area-than adjoining portions of the wearable strap, such that the tear away region has a lower ultimate tensile strength than the adjoining portions of the wearable strap.

* * * * *